United States Patent
Meredith et al.

(10) Patent No.: US 11,004,083 B2
(45) Date of Patent: May 11, 2021

(54) SYSTEM AND METHOD FOR AUTHORIZING DIRECT DEBIT TRANSACTIONS

(71) Applicant: Visa Cape Town Pty Ltd, Cape Town (ZA)

(72) Inventors: Owen David Meredith, Cape Town (ZA); Tiaan Cornelius Bakkes, Cape Town (ZA)

(73) Assignee: Visa Cape Town (Pty) Ltd, Durbanville (ZA)

( * ) Notice: Subject to any disclaimer, the term of this patent is extended or adjusted under 35 U.S.C. 154(b) by 698 days.

(21) Appl. No.: 14/899,012

(22) PCT Filed: Jun. 25, 2014

(86) PCT No.: PCT/IB2014/062592
§ 371 (c)(1),
(2) Date: Dec. 16, 2015

(87) PCT Pub. No.: WO2015/001452
PCT Pub. Date: Jan. 8, 2015

(65) Prior Publication Data
US 2016/0125409 A1    May 5, 2016

(30) Foreign Application Priority Data

Jul. 3, 2013   (ZA) .................................. 2013/04959

(51) Int. Cl.
*G06Q 30/04*    (2012.01)
*G06Q 20/40*    (2012.01)
(Continued)

(52) U.S. Cl.
CPC ......... *G06Q 20/405* (2013.01); *G06Q 20/023* (2013.01); *G06Q 20/108* (2013.01);
(Continued)

(58) Field of Classification Search
CPC ....... G06Q 20/405; G06Q 30/04; G06Q 40/12
See application file for complete search history.

(56) References Cited

U.S. PATENT DOCUMENTS 8,019,685 B2   9/2011  Patterson
8,095,464 B2   1/2012  Patterson et al.
(Continued)

OTHER PUBLICATIONS

Sullivan, R. J. (2013). The U.S. Adoption of Computer-Chip Payment Cards: Implications for Payment Frau. Economic Review (01612387), 1, 59-87.*

(Continued)

*Primary Examiner* — Muriel S Tinkler
(74) *Attorney, Agent, or Firm* — Kilpatrick Townsend & Stockton LLP

(57) ABSTRACT

A system and method for authorizing a direct debit transaction is provided. A remotely accessible server receives a request from a clearing entity to conduct a direct debit transaction against a financial account of a consumer on behalf of a merchant, and checks whether the consumer has previously approved a debit against the account on behalf of the merchant. If the consumer has previously approved a debit on behalf of the merchant, an authorization message is generated and transmitted to the clearing entity. If the consumer has not previously approved a debit on behalf of the merchant, an electronic prompt is generated to an electronic device of the consumer requesting the consumer to approve or deny the debit. In response to the consumer indicating approval, a debit authorization message is generated and transmitted to the clearing entity, and a database is updated to indicate approval by the consumer.

21 Claims, 6 Drawing Sheets

(51) Int. Cl.
*G06Q 20/26* (2012.01)
*G06Q 40/02* (2012.01)
*G06Q 20/42* (2012.01)
*G06Q 20/02* (2012.01)
*G06Q 20/10* (2012.01)
*G06Q 20/32* (2012.01)

(52) U.S. Cl.
CPC ......... *G06Q 20/26* (2013.01); *G06Q 20/3223* (2013.01); *G06Q 20/42* (2013.01); *G06Q 40/02* (2013.01)

(56) References Cited

U.S. PATENT DOCUMENTS

| | | | |
|---|---|---|---|
| 8,401,904 B1 | 3/2013 | Simakov et al. | |
| 8,527,381 B2* | 9/2013 | Gerstner | G06Q 40/00 705/35 |
| 2006/0015463 A1* | 1/2006 | Gupta | G06O 20/085 705/52 |
| 2006/0036553 A1* | 2/2006 | Gupta | G06Q 20/02 705/52 |
| 2008/0109280 A1* | 5/2008 | Csoka | G06Q 20/105 705/41 |
| 2009/0164354 A1 | 6/2009 | Ledbetter et al. | |
| 2011/0010277 A1* | 1/2011 | Enzaldo | G06Q 20/405 705/30 |
| 2011/0145149 A1* | 6/2011 | Valdes | G06Q 20/10 705/44 |
| 2011/0173122 A1 | 6/2011 | Singhal | |
| 2013/0151410 A1 | 6/2013 | Babi | |
| 2016/0092874 A1* | 3/2016 | O'Regan | G06Q 20/40 705/44 |

OTHER PUBLICATIONS

Bradford, T., & Keeton, W. R. (2012). New Person-to-Person Payment Methods: Have Checks Met Their Match? Economic Review (01612387), 3, 41-77.*

Ahamed, S. S. R. (2010). A Novel View on Electronic Cash and Electronic Payment Schemes: A Comprehensive Study. Computer Science & Telecommunications, 26(3), 180-197.* international Search Report dated Oct. 26, 2014 in PCT/IB2014/062592, 4 pages.

* cited by examiner

SYSTEM AND METHOD FOR AUTHORIZING DIRECT DEBIT TRANSACTIONS

This application is a National Stage of International Application No. PCT/IB2014/062592, International Filing Date Jun. 25, 2014, and which claims the benefit of South African Patent Application No. 2013/04959, filed Jul. 3, 2013, the disclosures of both applications being incorporated herein by reference.

BACKGROUND

Direct debits are commonly used to conduct various types of financial transactions. In the remainder of this specification the term "direct debit" should be interpreted to include any financial transaction in which one entity directly withdraws or collects funds from a financial account of another entity, or instructs an acquirer to withdraw or collect such funds on behalf of the entity. Common examples of direct debit transactions are pre-authorized debit transactions, debit orders, "bill pay" transactions, and the like.

In the case of a direct debit transaction, one entity, typically a merchant payee, withdraws or collects funds from a financial account of another entity ("the consumer"). The merchant instructs its acquiring bank to collect an amount directly from an account previously designated by the consumer. The funds are then transferred from the account of the consumer to an account designated by the merchant. Direct debit transactions are typically, once appropriately authorized, automatically processed by an electronic payment system or network.

In many cases, direct debits are used for conducting recurring financial transactions. The payment amounts may be fixed, such as loan installments or rental fees, or variable, such as mobile phone bills and utility bills. Direct debits may also be used for irregular or once-off payments, such as mail order or point of sale (POS) transactions.

A potential drawback of direct debits is that this type of transaction may present the risk of an unscrupulous party inappropriately obtaining funds from an account of a consumer. For example, a fraudulent party may have hoodwinked the consumer into unwillingly authorizing direct debits.

Furthermore, details of a direct debit transaction may be relatively difficult to modify. The administrative steps that need to be completed in order to modify a direct debit instruction, for example, the payment amount, the date of the payment, or the selected account to debit, may be time-consuming and may, in some cases, not be allowed by an issuing or acquiring bank. Successfully cancelling a single or recurring direct debit may also be time-consuming and/or cumbersome.

The present invention aims to alleviate at least some of the aforementioned problems.

BRIEF SUMMARY

In accordance with the invention there is provided a method of authorizing a direct debit transaction, the method carried out at a remotely accessible server and comprising the steps of: receiving a request from a clearing entity to conduct a direct debit transaction against a financial account of a consumer on behalf of a merchant; checking whether the consumer has previously approved a direct debit transaction against the financial account on behalf of the merchant; if the consumer has previously approved a direct debit transaction against the financial account on behalf of the merchant, generating a debit authorization message and transmitting the debit authorization message to the clearing entity; if the consumer has not previously approved a direct debit transaction against the financial account on behalf of the merchant, generating an electronic prompt to an electronic device of the consumer requesting the consumer to approve or deny the debit; and, in response to the consumer indicating approval of the debit, generating a debit authorization message, updating a database to indicate that the consumer has approved the debit, and transmitting the debit authorization message to the clearing entity; or, in response to the consumer indicating denial of the debit or failing to respond to the electronic prompt within a predetermined period, generating a denial message and transmitting the denial message to the clearing entity.

Further features provide for the step of updating the database to indicate that the consumer has approved the debit to include: updating the database to indicate that upon subsequent requests from a clearing entity to conduct a direct debit transaction against the financial account of the consumer on behalf of the merchant, a debit authorization message is to be generated and transmitted to the clearing entity; and for the method to include, in response to the consumer indicating denial of the debit or failing to respond to the electronic prompt within a predetermined period, updating the database to revoke any previous approval that may have been given in respect of the debit.

Yet further features provide for the electronic prompt to require the consumer to perform an authentication step on the electronic device before allowing the debit to be approved or denied; for the electronic prompt to request the consumer to enter a password or identification code before requesting the consumer to approve or deny the debit; for the request from the clearing entity to conduct a direct debit transaction against the financial account of the consumer to be a debit request originating from an acquirer; and for the electronic device of the consumer to be a mobile phone.

The method may further include one or more of the steps of: receiving a request from the electronic device of the consumer for details of standing direct debit instructions against the financial account of the consumer; looking up, in a database, one or more standing direct debit instructions against the financial account of the consumer, each standing direct debit order associated with a merchant; transmitting details of the one or more standing direct debit instructions to the electronic device of the consumer; receiving a request from the electronic device of the consumer to revoke a standing direct debit instruction associated with a merchant; revoking the standing direct debit instruction and either removing the instruction from the database or updating the database to indicate that the instruction has been revoked; and in response to subsequent requests from a clearing entity to debit the financial account of the consumer on behalf of the merchant associated with the instruction which was revoked, generating a denial message and transmitting the denial message to the clearing entity.

Further features provide for the method to include the steps of: receiving from the electronic device of the consumer a request to reactivate an electronic prompt requirement in respect of a direct debit transaction against the financial account on behalf of the merchant, the consumer having previously approved the debit, denied the debit or failed to respond to an electronic prompt relating to the debit within a predetermined period such that no further electronic prompts are to be transmitted to the electronic device of the consumer; and updating a database to revoke any approval or denial given in respect of the debit.

Yet further features provide for the method to include the steps of: receiving from the electronic device of the consumer a request to authorize a direct debit transaction against the financial account on behalf of the merchant, the consumer having previously denied the debit or previously failed to respond to an electronic prompt relating to the debit within a predetermined period; and updating a database to indicate that the consumer has approved the debit, and that upon subsequent requests from a clearing entity to conduct a direct debit transaction against the financial account of the consumer on behalf of the merchant, a debit authorization message is to be generated and transmitted to the clearing entity.

The method may further include the steps of: receiving from the electronic device of the consumer a request to impose at least one restriction on authorization of a direct debit transaction against the financial account on behalf of the merchant, the at least one restriction including one or more of: requiring authorization from the consumer if a debit amount changes, requiring authorization from the consumer if a debit frequency changes, and requiring authorization from the consumer if a debit date changes; and updating a database to indicate that upon subsequent requests from a clearing entity to conduct a direct debit transaction against the financial account of the consumer on behalf of the merchant, an electronic prompt is to be transmitted to the electronic device of the consumer requesting the consumer to approve or deny the debit if one or more of the at least one restriction is associated with the debit.

According to the invention there is provided a system for authorizing a direct debit transaction, including a remotely accessible server in communication with an electronic device of a consumer, the remotely accessible server comprising: a clearing request component for receiving a request from a clearing entity to conduct a direct debit transaction against a financial account of a consumer on behalf of a merchant; a checking component for checking whether the consumer has previously approved a direct debit transaction against the financial account on behalf of the merchant; a prior authorization component for, if the consumer has previously approved a direct debit transaction against the financial account on behalf of the merchant, generating a debit authorization message and transmitting the debit authorization message to the clearing entity; a prompting component for, if the consumer has not previously approved a direct debit transaction against the financial account on behalf of the merchant, generating an electronic prompt to the electronic device of the consumer requesting the consumer to approve or deny the debit; a consumer approval component for, in response to the consumer indicating approval of the debit, generating a debit authorization message, updating a database to indicate that the consumer has approved the debit, and transmitting the debit authorization message to the clearing entity; and a consumer denial component for, in response to the consumer indicating denial of the debit or failing to respond to the electronic prompt within a predetermined period, generating a denial message and transmitting the denial message to the clearing entity.

Further features provide for the request from the clearing entity to conduct a direct debit transaction against the financial account of the consumer received at the clearing request component to be a debit request transmitted to the clearing entity by an acquirer, the acquirer being an acquiring bank and the clearing entity being one of a clearing house, a banking switch and a payment processing network; for the request to be a batch direct debit file received from the acquirer; and for the request to be transmitted to the clearing entity from a core banking system of the acquiring bank.

Yet further features provide for the remotely accessible server to be one or more servers of an issuer; and for the issuer to be an issuing bank of the consumer. The issuer may form part of a mobile banking system. The financial account may be a mobile money account held at the issuer. An account identifier of the financial account may be a Mobile Station International Subscriber Directory Number (MSISDN) of the electronic device of the consumer.

Still further features provide for the system to further include the electronic device of the consumer, the electronic device being in communication with the remotely accessible server and comprising: a receiving component for receiving the electronic prompt requesting the consumer to approve or deny the debit from the remotely accessible server; a debit authorization interface for displaying the electronic prompt; an authorization component for receiving a response from the consumer indicating approval or denial of the debit; and a response transmitting component for transmitting the response to the remotely accessible server.

Further features provide for the remotely accessible server to further comprise one or more of: an instruction query component for receiving a request from the electronic device of the consumer for details of standing direct debit instructions against the financial account of the consumer; an instruction look-up component for looking up, in a database, one or more standing direct debit instructions against the financial account of the consumer, each standing direct debit order associated with a merchant; an instruction transmitting component for transmitting details of the one or more standing direct debit instructions to the electronic device of the consumer; a revocation request component for receiving a request from the electronic device of the consumer to revoke a standing direct debit instruction; a revoking component for revoking the standing direct debit instruction and either removing the instruction from the database or updating the database to indicate that the instruction has been revoked; and a debit blocking component for, in response to subsequent requests from a clearing entity to conduct a direct debit transaction against the financial account of the consumer on behalf of the merchant associated with the instruction which was revoked, generating a denial message and transmitting the denial message to the clearing entity.

According to the invention there is provided a computer program product for authorizing a direct debit transaction, the computer program product comprising a computer-readable medium having stored computer-readable program code for performing the steps of: receiving a request from a clearing entity to conduct a direct debit transaction against a financial account of a consumer on behalf of a merchant; checking whether the consumer has previously approved a direct debit transaction against the financial account on behalf of the merchant; if the consumer has previously approved a direct debit transaction against the financial account on behalf of the merchant, generating a debit authorization message and transmitting the debit authorization message to the clearing entity; if the consumer has not previously approved a direct debit transaction against the financial account on behalf of the merchant, generating an electronic prompt to an electronic device of the consumer requesting the consumer to approve or deny the debit; and in response to the consumer indicating approval of the debit, generating a debit authorization message, updating a database to indicate that the consumer has approved the debit, and transmitting the debit authorization message to the clearing entity; or in response to the consumer indicating denial of the debit or failing to respond to the electronic prompt within a predetermined period, generating a denial message and transmitting the denial message to the clearing entity.

The computer-readable medium may be a non-transitory computer-readable medium, and the computer-readable program code may be executable by a processing circuit.

In order that the invention may be more fully understood, implementations thereof will now be described with reference to the accompanying drawings.

DETAILED DESCRIPTION WITH REFERENCE TO THE DRAWINGS

A system and method for authorizing a direct debit transaction is provided. A remotely accessible server receives a request from a clearing entity to conduct a direct debit transaction against a financial account of a consumer on behalf of a merchant, and checks whether the consumer has previously approved a debit against the account on behalf of the merchant. If the consumer has previously approved a debit on behalf of the merchant, an authorization message is generated and transmitted to the clearing entity. If the consumer has not previously approved a debit on behalf of the merchant, an electronic prompt is generated to an electronic device of the consumer requesting the consumer to approve or deny the debit. In response to the consumer indicating approval, a debit authorization message is generated and transmitted to the clearing entity, and a database is updated to indicate approval by the consumer.

Figure 1A:
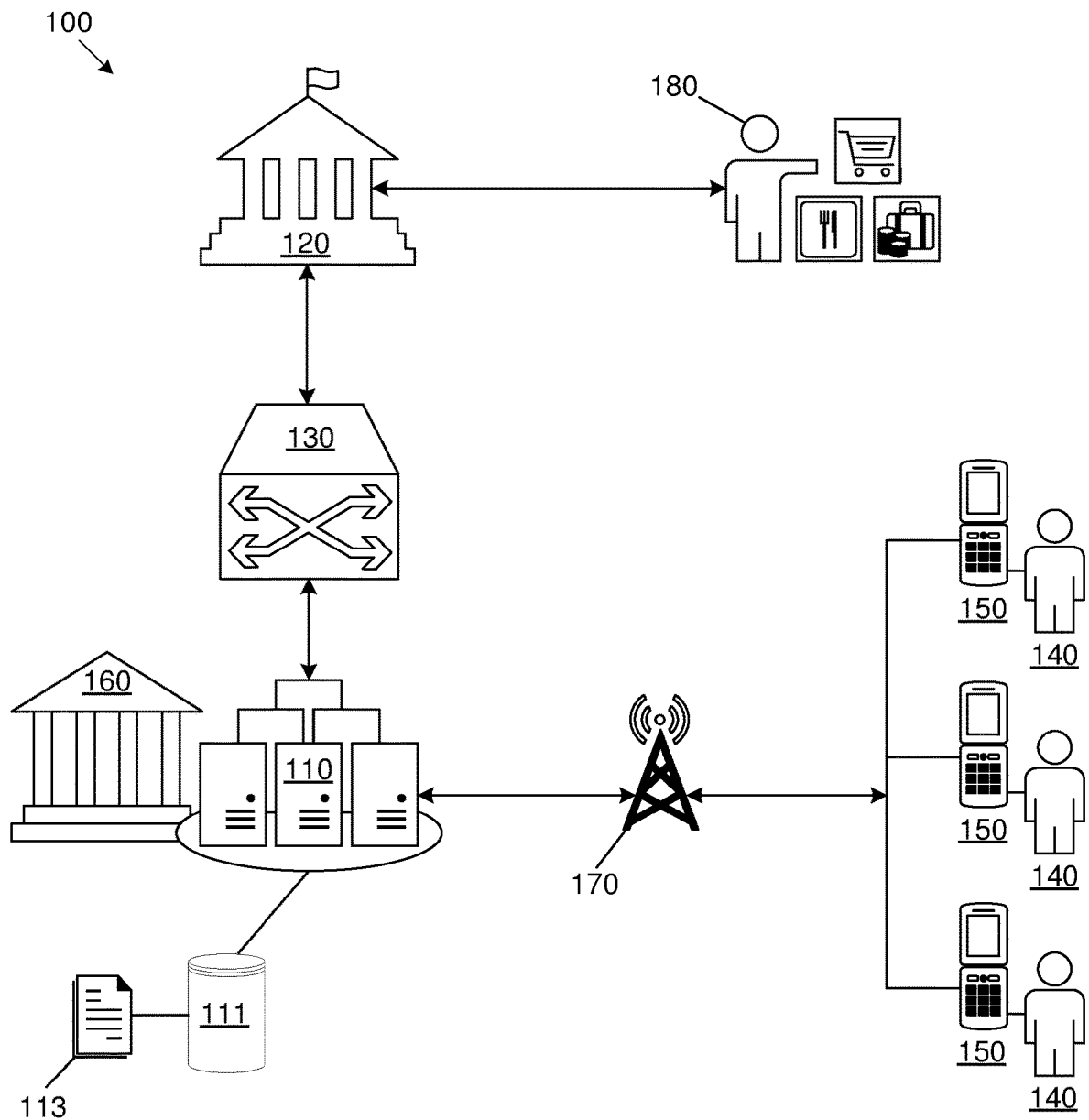
FIG. 1A is a schematic diagram of an embodiment of a system for authorizing direct debit transactions according to the present invention.

FIG. 1A illustrates an embodiment of a system (100) for authorizing direct debit transactions. The system (100) includes a remotely accessible server (110), an acquirer (120), a clearing entity (130), and a plurality of consumers (140) each having an electronic device (150) which is in communication with the remotely accessible server (110).

In some embodiments, the remotely accessible server (110) is a server of an issuer (160), typically an issuing bank. The server (110) may include a plurality of computerized servers of the issuer (160). In some embodiments described herein, the remotely accessible sever (110) forms part of a mobile banking system associated with the issuer (160), which may also be referred to as a mobile money system.

In cases where the remotely accessible server (110) is associated with an issuing bank, it may be controlled or managed by a mobile network operator that offers subscribers a mobile money program which can be accessed over a communications network via their electronic devices. The issuing bank may act with the mobile network operator to hold funds for consumers and perform a variety of transactions.

The acquirer (120) may be any acquiring or collecting financial institution, such as a traditional acquiring bank, a core banking system of the acquiring bank, or an acquiring mobile payment system or mobile banking system.

The clearing entity (130) may be any system, network or platform that provides clearing and/or settlement services to the acquirer (120) and the issuer (160), for example, a banking switch, a payment processing network, or the like. In some embodiments described herein, the clearing entity (130) is a clearing house. The clearing house may be an electronic network for financial transactions which processes large volumes of credit and debit transactions in batches. A direct debit transaction is a type of transaction commonly handled by such a clearing house.

The electronic device (150) of the consumer (140) may be any suitable electronic communications device capable of communicating with the remotely accessible server (110) over a communications network, such as a cellular network (170) or the Internet.

The term "electronic device" should throughout this specification be interpreted to include all mobile or cellular phones but may also include portable computers such as laptops, handheld personal computers, tablet computers, and the like, and non-portable computers such as desktop computers. In the embodiment of FIG. 1A, the electronic device (150) is a mobile phone of the consumer (140) having a financial account at the mobile banking system, also referred to as a mobile money account. A mobile phone number (in other words, the Mobile Subscriber Integrated Services Digital Network-Number (MSISDN)) associated with the electronic device (150) may typically be used as an account number or identifier of the financial account held at the mobile banking system.

The remotely accessible server (110) includes or has access to a database (111) containing a plurality of consumer records (113). These records (113) may include, for example, personal information of the consumer (140), an electronic device identifier, an account number, information on funds in one or more accounts held at the mobile banking system, and the like. In some embodiments, authorization details and other information relating to past and/or future direct debit transactions or direct debit instructions associated with the consumer (140) may also be stored as part of each consumer record (113).

The acquirer (120) acts to collect funds, via the clearing entity (130), from the account of the consumer (140) on behalf of a merchant (180). The term "merchant" should throughout this specification be broadly interpreted and the term may refer to any payee or potential payee on behalf of which the acquirer collects or attempts to collect funds from the financial account of the consumer.

Figure 1B:
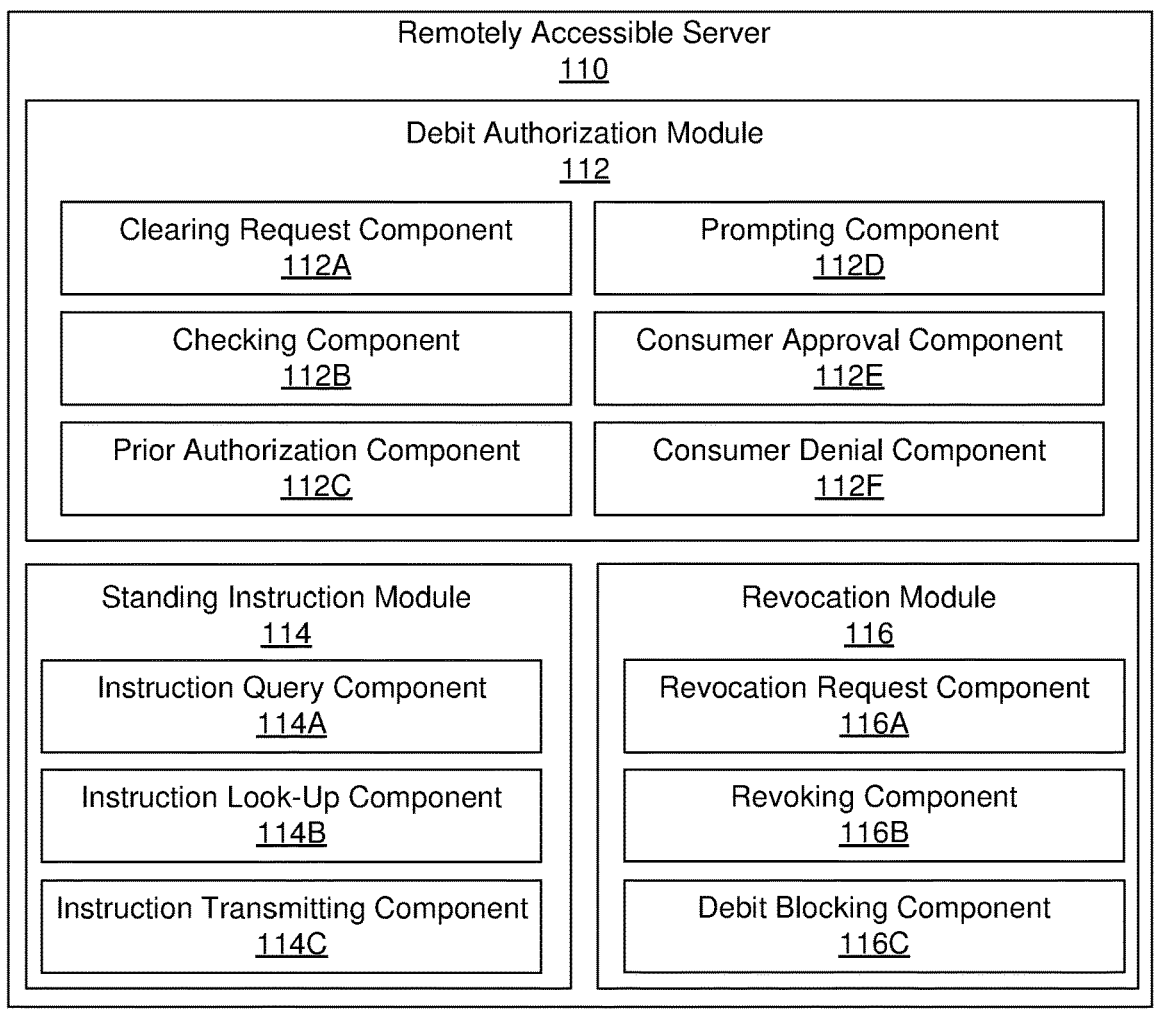
FIG. 1B is a block diagram of components of an embodiment of a remotely accessible server of FIG. 1A.

An embodiment of the remotely accessible server (110) of FIG. 1A may include various logical components. Such components may include one or more of a debit authorization module (112), a standing instruction module (114) and a revocation module (116). The debit authorization module (112) may include a clearing request component (112A), a checking component (112B), a prior authorization component (112C), a prompting component (112D), a consumer approval component (112E) and a consumer denial component (112F). The standing instruction module (114) may include an instruction query component (114A), an instruction look-up component (114B), and an instruction transmitting component (114C). The revocation module (116) may include a revocation request component (116A), a revoking component (116B) and a debit blocking component (116C). These components are illustrated in FIG. 1B.

Figure 1C:
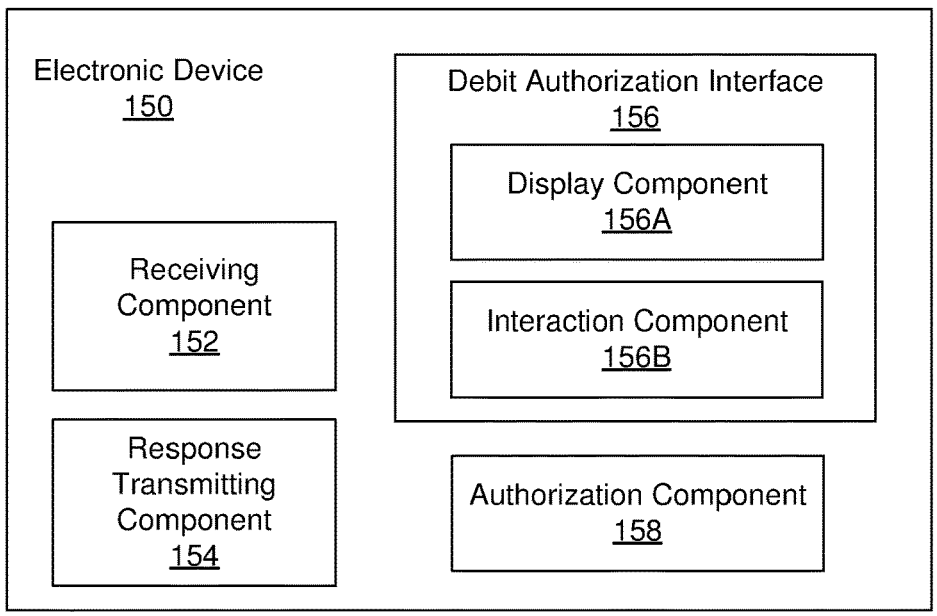
FIG. 1C is a block diagram of components of an embodiment of an electronic device of FIG. 1A.

An embodiment of an electronic device (150) used by a consumer (140) of FIG. 1A may also include various logical components. The components may include one or more of a receiving component (152), a response transmitting component (154), a debit authorization interface (156), and an authorization component (158). The debit authorization interface (156) may include a display component (156A) and an interaction component (156B). These components are illustrated in FIG. 1C, and functionality of the components of FIGS. 1B and 1C will be described in greater detail below.

Figure 2:
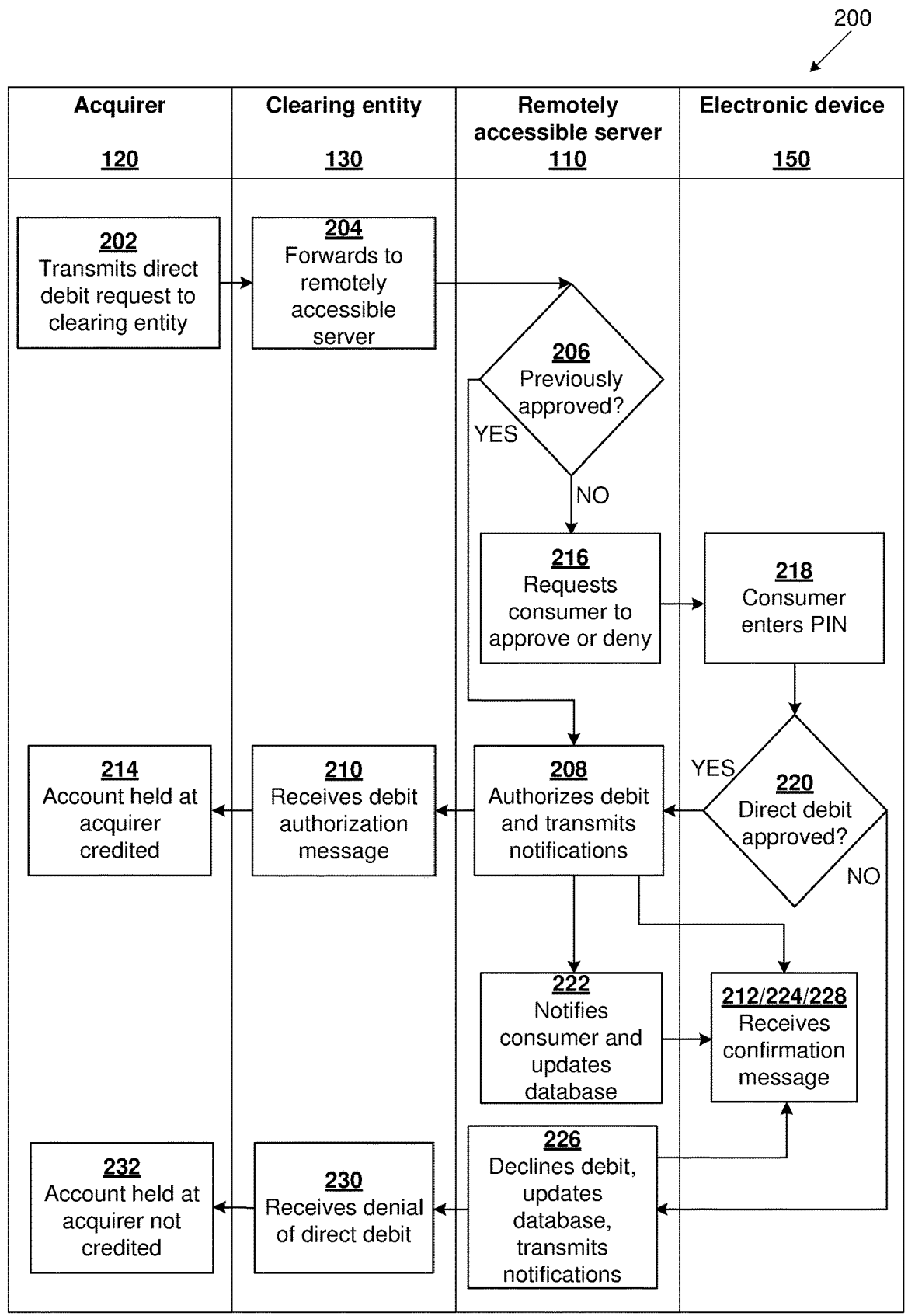
FIG. 2 is a swim lane flow diagram which illustrates an embodiment of a method of authorizing a direct debit transaction according to the present invention.

The flow diagram (200) of FIG. 2 illustrates a method of authorizing a direct debit transaction, employing a system such as the system (100) described with reference to FIG. 1A. The flow diagram (200) illustrates actions performed by the acquirer (120), the clearing entity (130), the remotely accessible server (110) and the electronic device (150) of the consumer (140), respectively.

At a first stage (202), the acquirer (120) transmits a direct debit request to the clearing entity (130). This direct debit request typically forms part of a periodic direct debit file, for example, a monthly, weekly or daily batch direct debit file transmitted to a clearing house by a core banking system of the acquirer (120). In such a case, the direct debit file generally also includes debit requests addressed to other issuers. The clearing entity (130) receives the direct debit file and determines which of the requests must be transmitted to the remotely accessible server (110). Accordingly, only the debit requests addressed to the mobile banking system associated with the issuer (160) are, at a next stage (204), forwarded to the remotely accessible server (110).

At a next stage (206), the remotely accessible server (110) receives the direct debit request. The request may be received at its clearing request component (112A). The request is a request to conduct a direct debit transaction against the financial account of the consumer (140), and prompts the remotely accessible server (110) to debit a financial account of the consumer (140) on behalf of a specific merchant (180). If the request is in the form of a batch request, the remotely accessible server (110) may identify various financial accounts which are to be debited.

Upon receiving the direct debit request, the remotely accessible server (110) accesses the consumer record (113) of the consumer (140) in question, which is stored in the database (111), and checks whether the consumer (140) has previously approved a debit of the financial account on behalf of the same merchant (180). The database (111) may be checked using the checking component (112B) of the debit authorization module (112).

If the consumer record (113) indicates that the consumer (140) has previously approved a direct debit transaction against the financial account on behalf of the merchant (180), the remotely accessible server (110), at a next stage (208), may use the prior authorization component (112C) to authorize the direct debit without requiring approval from the consumer (140). The remotely accessible server (110) generates a debit authorization message and transmits it to the clearing entity (130) and optionally also to the consumer (140). In this embodiment, the clearing entity (130) and the consumer (140) (on the electronic device (150)) both receive confirmation messages (at stages 210 and 212) from the remotely accessible server (110), indicating that the direct debit has been authorized.

Once the direct debit has been authorized by the remotely accessible server (110), the direct debit transaction may be conducted via the clearing entity (130) in a conventional fashion as will be well known to and understood by those skilled in the art. The financial account of the consumer (140) is then debited and at a final stage (214) an account of the merchant (180), held at the acquirer (120), is credited correspondingly. Of course, fees may be charged may a number of the entities involved and may influence the balance of the accounts of the consumer (140) and merchant (180).

If, at the initial stage (206), the consumer record (113) indicates that the consumer (140) has not previously approved a direct debit transaction against the financial account on behalf of the particular merchant (this may include no previous direct debit transaction or transaction request relating to the merchant, previously denying a debit of the financial account on behalf of the particular merchant and/or not responding in time to a request to approve or deny the debit), the remotely accessible server (110), at a next stage (216), may use its prompting component (112D) to generate an electronic prompt to the electronic device (150) of the consumer (140) requesting the consumer (140) to approve or deny the debit. The electronic prompt may include, for example, a direct debit amount, a transaction date or dates, merchant information, acquirer information, the consumer account to be debited, or the like.

Communication between the remotely accessible server (110) and the electronic device (150) of the consumer (140) may be carried out using any suitable communication protocol, such as Short Message Service (SMS) protocol, Unstructured Supplementary Service Data (USSD) protocol, any suitable form of data communication, and the like. In some embodiments, the remotely accessible server (110) transmits a push message to the electronic device (150) of the consumer (140) which is received and displayed to the consumer (140) by means of a mobile software application installed on the electronic device (150). In one embodiment, the communication channel between the electronic device (150) and the remotely accessible server (110) is an end-to-end secure communication channel.

The electronic device (150) includes a receiving component (152) for receiving the electronic prompt from the remotely accessible server (110). The electronic device (150) may also include a debit authorization interface (156) which allows the prompt to be displayed using a display component (156A) and a response to be received from the consumer (140) using an interaction component (156B). The response may be received at an authorization component (158) which interprets the response to determine whether the consumer (140) approves or denies the direct debit transaction.

The consumer (140) may be required to perform any suitable authentication step before allowing the debit to be approved or denied. In one embodiment and as illustrated in FIG. 2, the consumer (140) is required to enter a personal identification number (PIN), identification code, passphrase, passcode, or the like, at a next stage (218), before being allowed to approve or deny the direct debit request. This provides an additional layer of security in the case that an unscrupulous or fraudulent party attempts to approve or deny a particular direct debit using the electronic device (150) of the consumer (140).

At a next stage (220), the consumer (140) uses the electronic device (150) to transmit either an approval or denial response to the direct debit request to the remotely accessible server (110), using the response transmitting component (154) of the electronic device (150).

In response to the consumer (140) indicating approval of the direct debit, the steps (208-214) similar to the case where the consumer (140) had previously approved the debit for a particular merchant are carried out. In other words, the remotely accessible server (110) authorizes conducting of the direct debit transaction against the financial account, generates a debit authorization message and transmits it to the clearing entity (130) and, in this case optionally, to the consumer (140). The clearing entity (130) and the consumer (140) (on the electronic device (150)) both receive confirmation messages (at stages 210 and 212) from the remotely accessible server (110), indicating that the direct debit has been authorized by the issuer. The financial account of the consumer (140) is then debited and at a next stage (214) an account of the merchant, held at the acquirer (120), is credited.

In response to the consumer indicating approval of the direct debit transaction, at a next stage (222), the database (111) is updated to indicate that the consumer (140) has approved the debit associated with the merchant. This may be carried out using the consumer approval component (112E). At a next stage (224), the consumer (140) is notified by the remotely accessible server (110) that subsequent direct debit requests from the same merchant (180) will be authorized without prompting the consumer (140) to first approve or deny the direct debit.

Alternatively, if the consumer (140) denies the direct debit request at the earlier stage (220), or if the consumer (140) fails to respond within a predetermined period, the remotely accessible server (110), at a next stage (226), denies the direct debit transaction, generates a denial message, and transmits the denial message to the clearing entity (130). In such a case, the consumer denial component (112F) may be used to, in response to the consumer indicating denial of the debit or failing to respond to the electronic prompt within a predetermined period, updating the database (111) to indicate that the consumer (140) has denied the debit associated with the merchant. At a next stage (228), the consumer (140) is notified by the remotely accessible server (110) that subsequent direct debit requests from the same merchant will be automatically denied, without prompting the consumer (140) to first approve or deny the direct debit.

It is foreseen that, in an alternative embodiment, at the initial stage (206), if the remotely accessible server (110) determines that the consumer (140) has previously denied a direct debit request from the same merchant, the remotely accessible server (110) may simply request the consumer (140) to, once again, approve or deny the direct debit in a similar fashion to what is described above. In such a case, therefore, subsequent direct debit requests from the same merchant will not be automatically denied, requiring the consumer (140) to approve or deny such a request on each separate occasion.

At a next stage (230), the clearing entity (130) receives a notification from the remotely accessible server (110) indicating that the request to debit the financial account has been denied. The acquirer (120), at a final stage (232), is then not permitted to credit the account held by the merchant (180). Correspondingly, the account of the consumer is not debited.

The method of authorizing a direct debit as described above therefore provides a way of ensuring that a direct debit, and particularly a recurring payment, has been properly authorized before deducting any funds from the financial account of a consumer.

If the consumer approves an initial direct debit transaction on behalf of a particular merchant, the database may be updated to indicate that upon subsequent requests from a clearing entity to conduct a direct debit transaction against the financial account of the consumer on behalf of the same merchant, a debit authorization message is to be generated and transmitted to the clearing entity. Alternatively, in response to the consumer indicating denial of the debit or failing to respond to the electronic prompt within a predetermined period, the database may be updated to revoke any previous approval that may have been given in respect of the debit.

Great control over direct debits may be ensured by enabling the consumer to electronically authorize, by means of the electronic device, the direct debit transaction on the first occasion a clearing entity requests to carry out a debit, wherein the debit request originates from a particular source. If the direct debit for this source is approved on the first occasion, it may in some embodiments automatically continue thereafter, without requiring consumer authorization on subsequent occasions, generating only a notification which is transmitted to the electronic device. If, on the other hand, the direct debit for this source is rejected on the first occasion, subsequent direct debit requests may either be automatically rejected or trigger an authorization request to the electronic device of the consumer on each subsequent occasion.

The system and method provided may prevent an unscrupulous or fraudulent party or entity from inappropriately deducting funds from the financial account of a consumer. For example, in a case where such a party has hoodwinked the consumer into unwillingly authorizing direct debits from the consumer's account, the consumer may simply deny the direct debit on the first occasion it is presented to the electronic device of the consumer for approval or denial.

Figure 3:
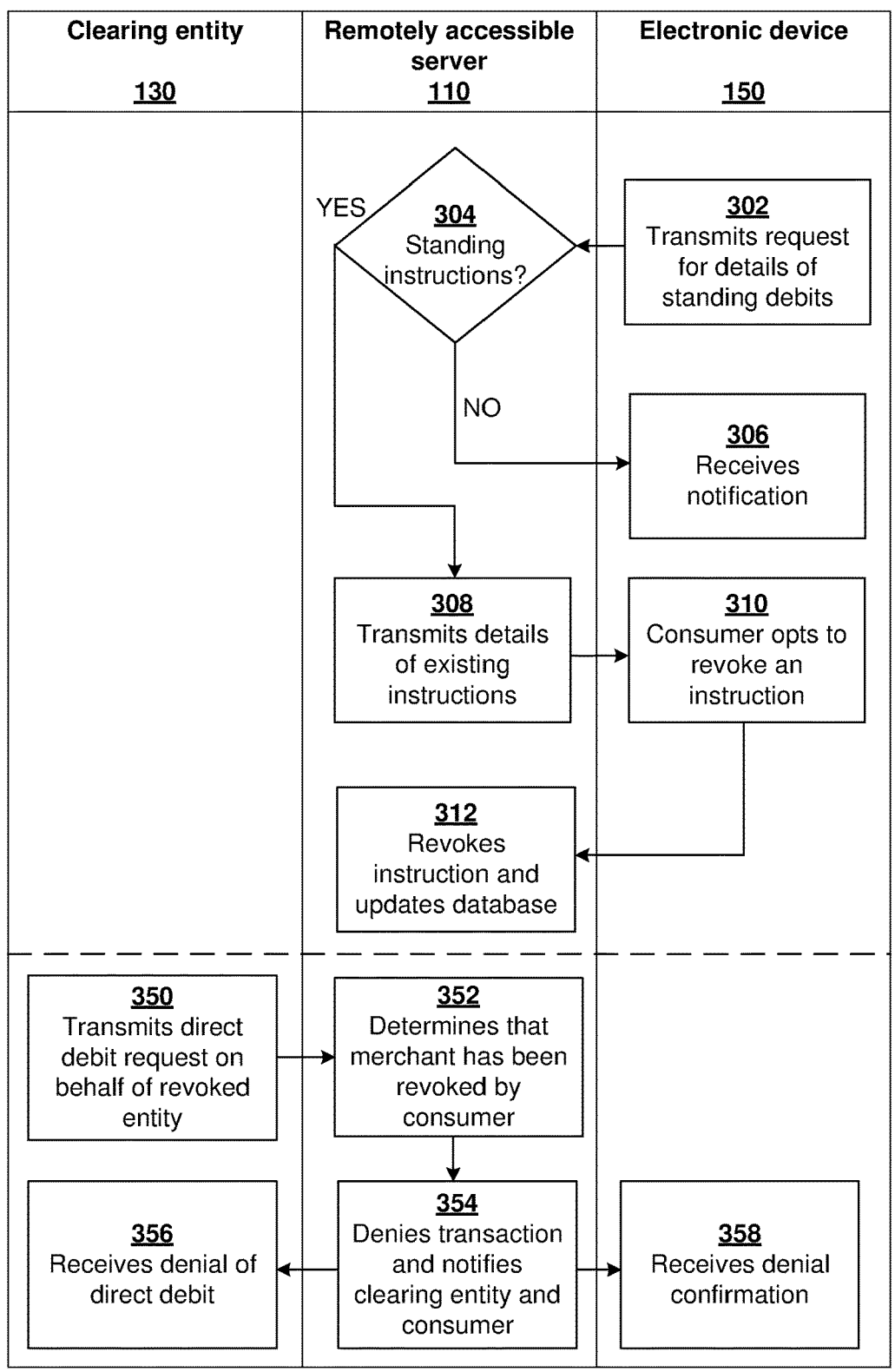
FIG. 3 is a swim lane flow diagram which illustrates a series of steps conducted to revoke standing direct debit instructions according to the present invention.

Further aspects of the method and system described are illustrated in FIGS. 3 to 6. The flow chart (300) of FIG. 3 illustrates a series of steps conducted to revoke a standing debit order instruction using the system (100) of FIG. 1A.

At a first stage (302), the consumer (140) uses the electronic device (150) to request details of standing direct debit instructions from the remotely accessible server (110). Typically, such communications are provided by means of a USSD session between the electronic device (150) and the remotely accessible server (110) or using a mobile software application resident on the electronic device (150). It should be appreciated that any other suitable communications protocol may be used for this purpose. The remotely accessible server (110) may receive the request for details of standing direct debit instructions at its instruction query component (114A).

At a next stage (304), the remotely accessible server (110) uses its instruction look-up component (114B) to look up the appropriate consumer record (113) in the database (111) to determine whether any standing direct debit instructions exist against the financial account of the consumer (140). Each standing direct debit instruction stored in the database (111) is associated with a merchant.

If the consumer record (113) indicates that no standing direct debit instructions exist for the consumer (140), at a next stage (306), the remotely accessible server (110) transmits a notification thereof to the electronic device (150). If one or more standing direct debit instructions are found in the consumer record (113), the remotely accessible server (110), at a next stage (308), transmits details of one or more of the existing instructions to the electronic device (150). The details may be transmitted using the instruction transmitting component (114C).

Typically, a standing instruction may refer to a direct debit transaction which the consumer (140) has previously approved using the method as described with reference to FIG. 2. Standing instructions may include any other direct debit transactions scheduled to occur, irrespective of whether they have been authorized using the above method.

The consumer (140) may then, after receiving and viewing the standing direct debit instructions, wish to revoke one of the standing instructions. The consumer (140) may, of course, alternatively initiate revocation of a standing instruction without first requesting details of all standing instructions.

At a next stage (310), the consumer (140) transmits, to the remotely accessible server (110) an instruction to revoke one of the standing instructions. The remotely accessible server (110) may, similarly to the example described with reference to FIG. 2, require the consumer (140) to enter a PIN, passcode or passphrase before revoking the instruction at a next stage (312).

The remotely accessible server (110) may receive the request to revoke a standing instruction at its revocation request component (116A), may revoke the instruction using its revoking component (116B), and may subsequently block relevant debits using the debit blocking component (116C).

In some embodiments, the database (111) is updated so as to remove the instruction from the consumer record (113). In some embodiments, the database (111) is updated to indicate that the standing instruction has been revoked, and that in response to subsequent requests from a clearing entity to debit the financial account of the consumer on behalf of the merchant associated with the instruction revoked by the consumer (140), the request must be denied, a denial message must be generated using the blocking component (116C) and transmitted to the clearing entity, and optionally also to the electronic device (150).

The revoked instruction may, in some cases, be a recurring direct debit transaction which the consumer (140) has approved on a previous occasion. For example, the consumer (140) may have been satisfied with initial transaction details, such as a debit amount and debit dates provided, and proceeded to approve the transaction at an initial stage, but now wishes to revoke the recurring direct debit due to the fact that, over time, changes in the debit amount or frequency of debits which were not agreed upon between the consumer (140) and the merchant have taken place. Alternatively, the consumer (140) may wish to revoke a standing instruction because the consumer (140) never agreed to it being set up in the first place, or because the consumer (140) was hoodwinked into agreeing to the direct debit, or for any other suitable reason. The consumer (140) may be required to supply a reason for wishing to revoke the debit.

At a future stage (350), after the standing direct debit instruction has been revoked, the clearing entity (130) may receive another direct debit request on behalf of the merchant associated with the revoked direct debit instruction. The remotely accessible server (110), at a next stage (352), receives the request and accesses the consumer record (113) to check whether instructions from the specific source have been revoked.

In this case, the remotely accessible server (110) determines that the consumer (140) has revoked debits from the merchant and, at a next stage (354), denies the requested direct debit transaction. The remotely accessible server (110) may then proceeds to notify the clearing entity (130) and the consumer (140) (on the electronic device (150) of the consumer (140)) that a direct debit request has been received from the particular merchant, and subsequently denied.

It should be appreciated that the remotely accessible server (110) may, upon such subsequent requests, generate an electronic prompt to the electronic device (150) of the consumer (140) requesting the consumer (140) to approve or deny the direct debit once again, instead of automatically denying the requested direct debit transaction.

The technology described may provide a consumer with the ability to deactivate a recurring transaction at any stage if the consumer wishes to terminate it. This may reduce the risk of funds inappropriately being deducted from the account of the consumer. The consumer may revoke a standing instruction before any funds are inappropriately deducted from the account. Furthermore, this may reduce the complexity, administrative steps and/or time needed to terminate a recurring or single pre-authorized direct debit.

In some cases, a consumer may wish to reactivate the electronic prompt requirement for direct debits in respect of a certain merchant. Furthermore, a consumer may wish to permanently authorize direct debits in respect of a merchant which was previously denied. Moreover, a consumer may wish to impose certain restrictions on the authorization of direct debit transactions relating to a particular merchant. Implementations of these features are described with reference to FIGS. 4-6.

Figure 4:
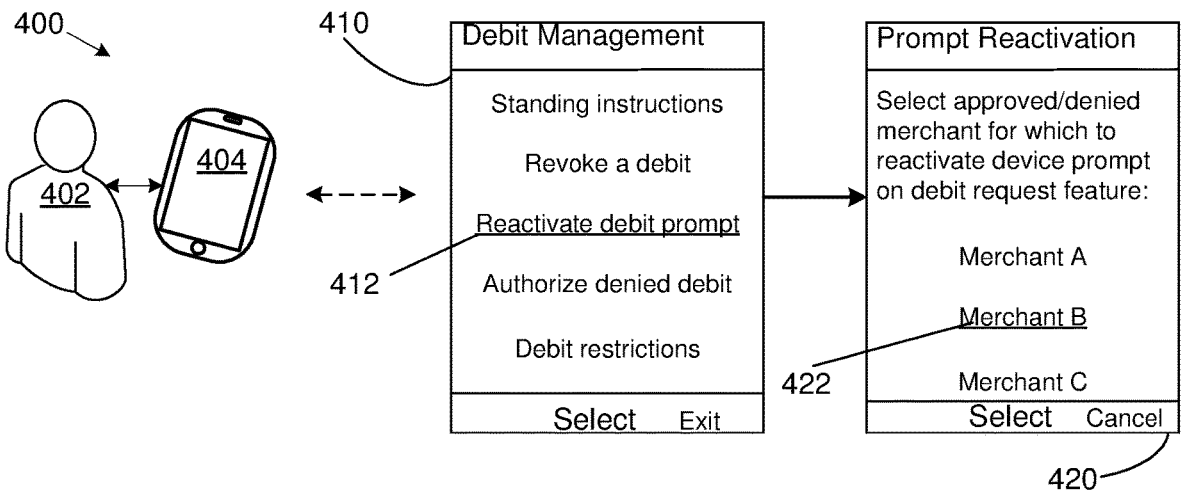
FIG. 4 illustrates an exemplary implementation of further aspects of the described method on an electronic device of a consumer according to the present invention.

FIG. 4 shows a scenario (400) with a consumer (402) having an electronic device (404) by which it is capable of communicating with a remotely accessible server such as the server (110) of FIG. 1A.

The consumer (402) wishes to reactivate the electronic prompt feature for a future direct debit request on behalf of a certain merchant for which no electronic is being received, either due to a previous denial by the consumer (402) or a previous approval by the consumer (402).

Figure 5:
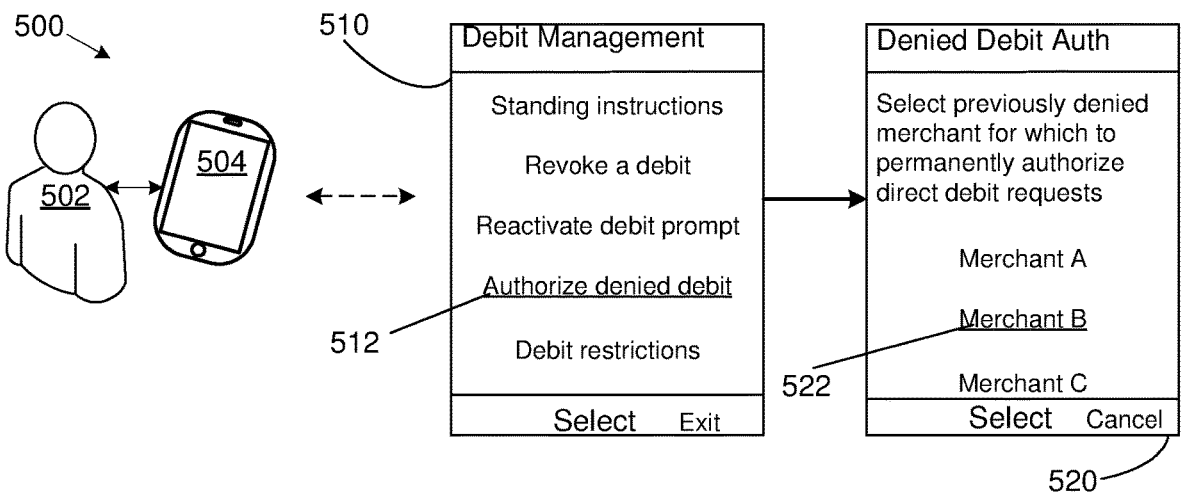
FIG. 5 illustrates an exemplary implementation of further aspects of the described method on an electronic device of a consumer according to the present invention.
Figure 6:
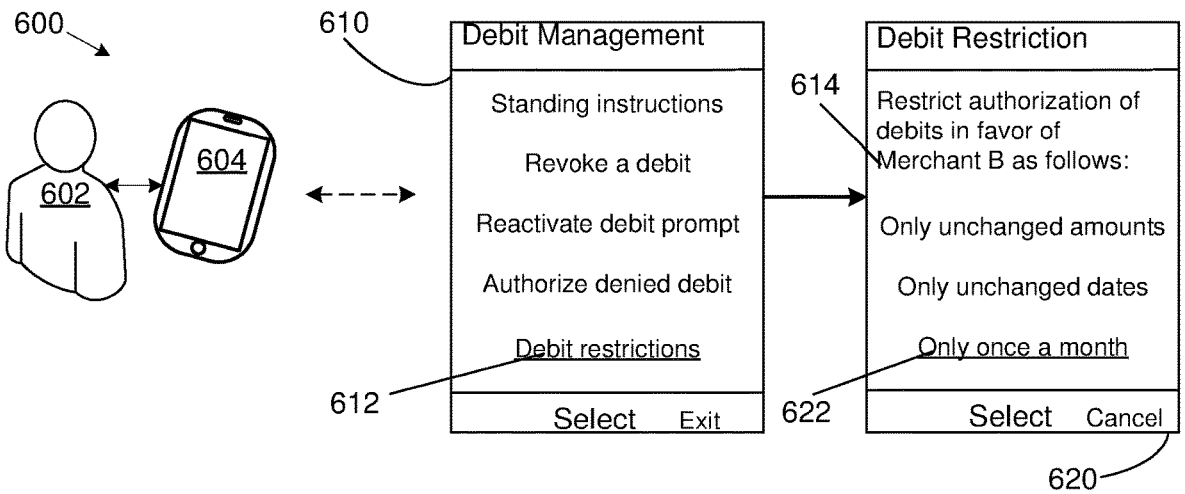
FIG. 6 illustrates an exemplary implementation of further aspects of the described method on an electronic device of a consumer according to the present invention.

The consumer (402) uses the electronic device (404) to access a "Debit Management" menu provided by its issuer or a mobile banking service. The consumer (402) may access this menu using any suitable communications means as described above. In the examples of FIGS. 4 to 6, the consumer (402) initiates a USSD session to communicate with the remotely accessible server (110).

In this example, the consumer (402) is provided with the option of viewing standing instructions or revoking a direct debit as described with reference to FIG. 3, and is also provided with options to reactivate electronic prompts, authorize previously denied debits, and impose restrictions on certain direct debit transactions. An exemplary display (410) of the electronic device (404) indicates these options.

The consumer (402) selects the "Reactivate debit prompt" option (412). The consumer (402) is then presented with a list of merchants (420) in respect of which direct debit transactions were previously denied or approved and in respect of which the consumer (402) will not be prompted for approval or denial in the current state, in other words, as currently indicated in the consumer record. The consumer selects "Merchant B" (422) and thus requests to reactivate an electronic prompt requirement in respect of a future direct debit transaction against the financial account on behalf of the merchant. In some cases, the consumer (402) may not have denied the merchant, but may have failed to respond to an electronic prompt relating to the debit within a predetermined period.

Upon receiving this selection, the remotely accessible server updates a consumer record in the database to revoke any approval or denial given in respect of the debit, whatever the case may be. Subsequently, when the particular merchant wishes to collect funds from the consumer (402), the consumer (402) will be provided with an electronic prompt requesting the consumer (402) to confirm or deny the direct debit transaction, as more fully described above.

FIG. 5 shows a scenario (500) with a consumer (502) having an electronic device (504) by which it is capable of communicating with a remotely accessible server such as the server (110) of FIG. 1A. The consumer (502) wishes to authorize a direct debit transaction on behalf of a merchant which it previously denied, or in relation to which it previously failed to respond to an electronic prompt to approve or deny a debit.

The consumer (502) uses the electronic device (504) to access a "Debit Management" menu (510) as described with reference to FIG. 4. The consumer (502) selects the "Authorize denied debit" option (512). The consumer (502) is then presented with a list of merchants (520) in respect of which direct debit transactions were previously denied. The consumer selects "Merchant B" (522) and thus requests to authorize future direct debit transactions against the financial account on behalf of the specific merchant.

Upon receiving this selection, the remotely accessible server proceeds to update the consumer record in the database to indicate that the consumer (502) has approved the debit, and that upon subsequent requests from a clearing entity to conduct a direct debit transaction against the financial account of the consumer (502) on behalf of the merchant, a debit authorization message is to be generated and transmitted to the clearing entity.

FIG. 6 also shows a scenario (600) with a consumer (602) having an electronic device (604) by which it is capable of communicating with a remotely accessible server such as the server (110) of FIG. 1A. The consumer (602) wishes to impose restrictions on authorization of a direct debit transaction against the financial account on behalf of a particular merchant.

The consumer (602) uses the electronic device (604) to access a "Debit Management" menu (610) as described with reference to FIG. 4. The consumer (602) selects the "Debit restrictions" option (612), and at a next stage (not shown) selects a merchant in respect of which to impose restrictions. "Merchant B" (614) is selected in this example.

The consumer (602) is then presented with a list of options (620) relating to restrictions that may be imposed on the authorization of debits in favor of the selected merchant. In this example, the options are as follows: to only allow direct debit transactions which have an unchanged amount, in other words of which the amount is the same as the amount of a first approved direct debit, to only allow direct debits occurring on the same date as the date of the first approved direct debit, and to only allow direct debits once a month.

The consumer may therefore choose to first approve, for example through an electronic prompt, certain direct debits on behalf of the merchant before they are processed. In this particular example, the consumer (602) can choose to require authorization from the consumer (602) if a debit amount changes, if a debit frequency changes, and/or if a debit date changes. These restrictions are primarily used for exemplary purposes, and it should be appreciated that any other suitable restriction may be applied or available to the consumer to ensure that direct debits in respect of a certain merchant are controlled in a desired manner. In some embodiments, the consumer (602) may be able to permit the remotely accessible server to deny direct debit transactions corresponding to one or more restrictions without requiring the consumer (602) to first approve or deny the transaction.

As shown in FIG. 6, the consumer (602) then chooses the "Only once a month" option. Upon receiving the selection, the remotely accessible server updates the consumer record in the database to indicate that upon subsequent requests from a clearing entity to conduct a direct debit transaction against the financial account of the consumer on behalf of the merchant, an electronic prompt is to be transmitted to the electronic device (604) of the consumer (602) requesting the consumer (602) to approve or deny the debit if one or more of the at least one restriction is associated with the debit.

For example, the remotely accessible server may determine that a direct debit transaction has already been successfully processed in the same month, and may then require the consumer to approve or deny a further request from the same merchant to conduct a second direct debit transaction against the financial account in the same month.

It should be appreciated that some embodiments may include, for example, the ability for a consumer to revoke transactions and impose restrictions on direct debits, while other embodiments may include, for example, the ability for a consumer to reactivate electronic prompts and authorize previously denied direct debits. Different embodiments may therefore include different combinations of the features described with reference to FIGS. 3 to 6. The consumer may, in some embodiments, be able to select desired features which are then available when accessing a menu similar to the menus shown in FIGS. 4 to 6.

The technology described may therefore not only aid a consumer in approving, denying and/or revoking direct debit transactions from a certain merchant, but may also enable a consumer to reactivate the electronic prompt requirement for direct debits in respect of a merchant which a consumer has previously denied, permanently authorize direct debits in respect of a merchant which was previously denied, and/or impose restrictions on the authorization of direct debit transactions relating to the merchant, as indicated above.

It should be appreciated that the "electronic prompt" referred to throughout this specification may be implemented in a number of ways without departing from the scope of the invention. The electronic prompt may, for example, be transmitted to the consumer using email or a web service exchange instead of transmitting the electronic prompt using the MSISDN or other identifier of the electronic device. In such a case, the consumer may use the electronic device to access and/or respond to the electronic prompt. The electronic prompt which allows the consumer to approve or deny a direct debit transaction or an aspect of such a transaction may therefore be transmitted using any suitable form of wired or wireless electronic communications.

The technology described herein may be implemented, at least to some extent, as one or more computer program product for authorizing a direct debit transaction. The computer program product may comprise a computer-readable medium having stored computer-readable program code for performing one or more of the steps of: receiving a request from a clearing entity to conduct a direct debit transaction against a financial account of a consumer on behalf of a merchant; checking whether the consumer has previously approved a direct debit transaction against the financial account on behalf of the merchant; if the consumer has previously approved a direct debit transaction against the financial account on behalf of the merchant, generating a debit authorization message and transmitting the debit authorization message to the clearing entity; if the consumer has not previously approved a direct debit transaction against the financial account on behalf of the merchant, generating an electronic prompt to an electronic device of the consumer requesting the consumer to approve or deny the debit; and in response to the consumer indicating approval of the debit, generating a debit authorization message, updating a database to indicate that the consumer has approved the debit, and transmitting the debit authorization message to the clearing entity; or in response to the consumer indicating denial of the debit or failing to respond to the electronic prompt within a predetermined period, generating a denial message and transmitting the denial message to the clearing entity.

The computer-readable medium may be a non-transitory computer-readable medium, and the computer-readable program code may be executable by a processing circuit.

Figure 7:
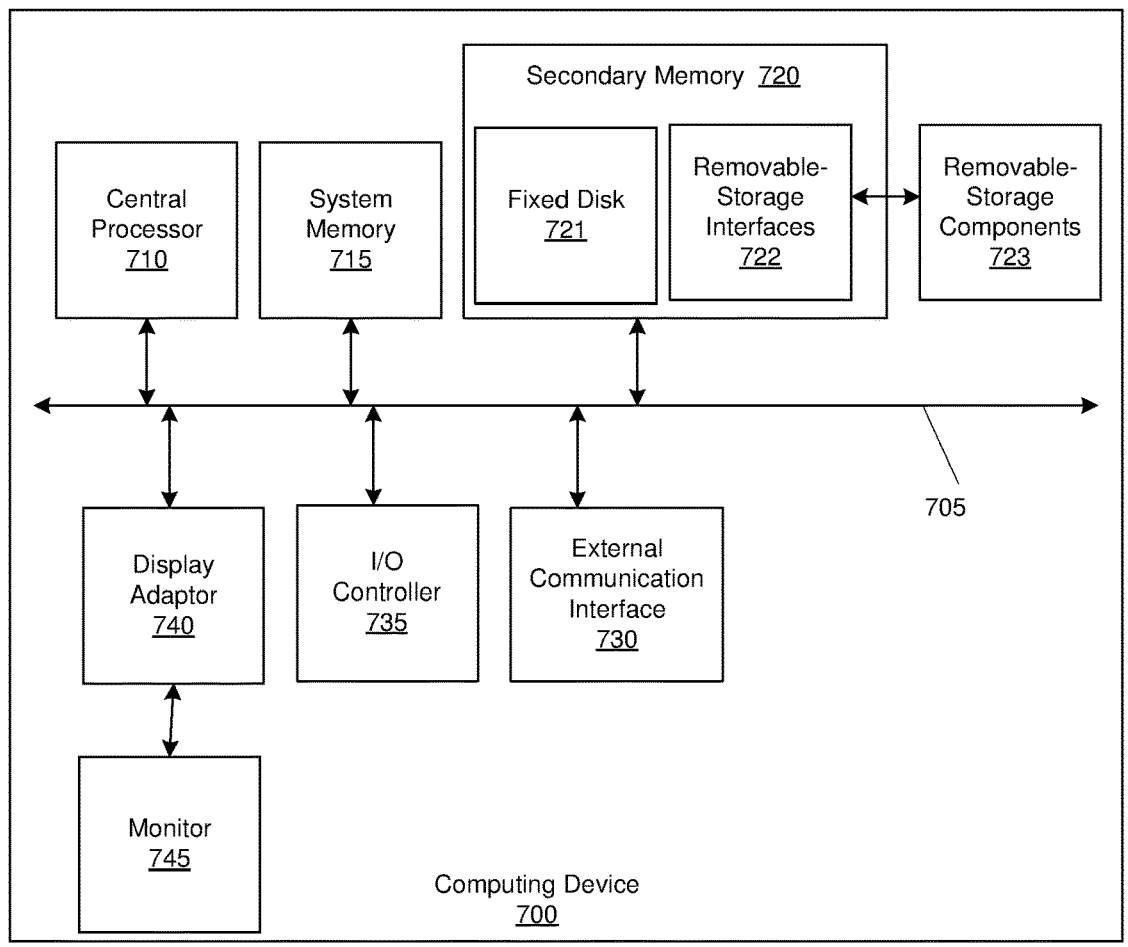
FIG. 7 illustrates a block diagram of a computing device in which various aspects of the invention may be implemented.

FIG. 7 illustrates an example of a computing device (700) in which various aspects of the disclosure may be implemented. The computing device (700) may be suitable for storing and executing computer program code. The various participants and elements in the previously described system diagrams may use any suitable number of subsystems or components of the computing device (700) to facilitate the functions described herein.

The computing device (700) may include subsystems or components interconnected via a communication infrastructure (705) (for example, a communications bus, a cross-over bar device, or a network). The computing device (700) may include at least one central processor (710) and at least one memory component in the form of computer-readable media.

The memory components may include system memory (715), which may include read only memory (ROM) and random access memory (RAM). A basic input/output system (BIOS) may be stored in ROM. System software may be stored in the system memory (715) including operating system software.

The memory components may also include secondary memory (720). The secondary memory (720) may include a fixed disk (721), such as a hard disk drive, and, optionally, one or more removable-storage interfaces (722) for removable-storage components (723).

The removable-storage interfaces (722) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (722) may also be in the form of ports or sockets for interfacing with other forms of removable-storage components (723) such as a flash memory drive, external hard drive, or removable memory chip, etc.

The computing device (700) may include an external communications interface (730) for operation of the computing device (700) in a networked environment enabling transfer of data between multiple computing devices (700). Data transferred via the external communications interface (730) may be in the form of signals, which may be electronic, electromagnetic, optical, radio, or other types of signal.

The external communications interface (730) may enable communication of data between the computing device (700) and other computing devices including servers and external storage facilities. Web services may be accessible by the computing device (700) via the communications interface (730).

The external communications interface (730) may also enable other forms of communication to and from the computing device (700) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (710).

A computer program product may be provided by a non-transient computer-readable medium, or may be provided via a signal or other transient means via the communications interface (730).

Interconnection via the communication infrastructure (705) allows a central processor (710) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (700) either directly or via an I/O controller (735). These components may be connected to the computing device (700) by any number of means known in the art, such as a serial port.

One or more monitors (745) may be coupled via a display or video adapter (740) to the computing device (700).

Figure 8:
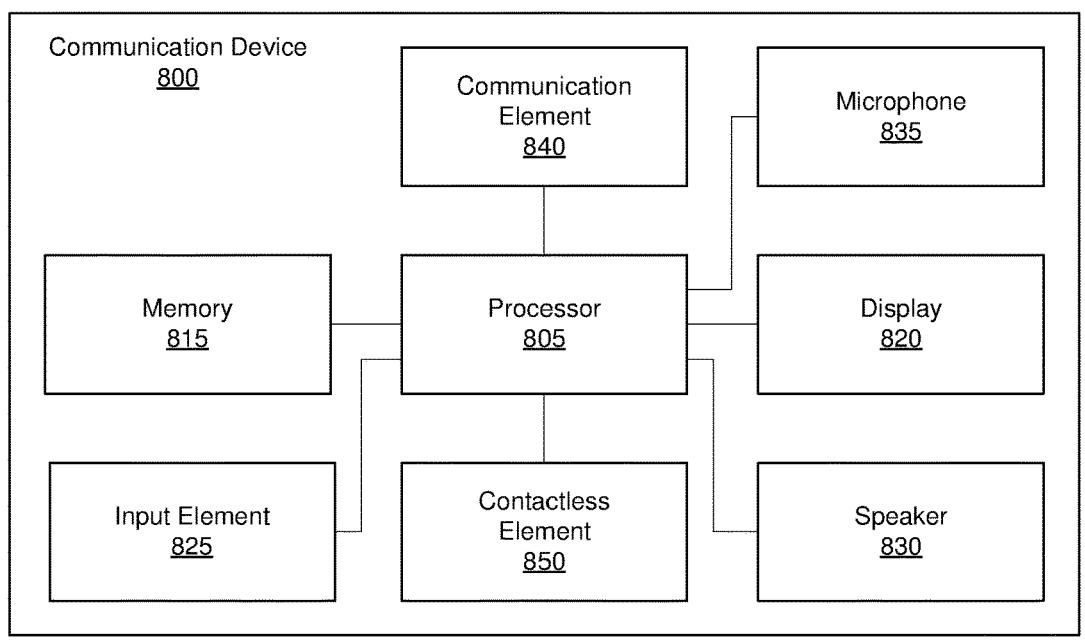
FIG. 8 illustrates a block diagram of a communication device that can be used in various embodiments of the invention.

FIG. 8 shows a block diagram of a communication device (800) that may be used in embodiments of the disclosure. The communication device (800) may be a cell phone, a feature phone, a smart phone, a satellite phone, or a computing device having a phone capability.

The communication device (800) may include a processor (805) (e.g., a microprocessor) for processing the functions of the communication device (800) and a display (820) to allow a user to see the phone numbers and other information and messages. The communication device (800) may further include an input element (825) to allow a user to input information into the device (e.g., input buttons, touch screen, etc.), a speaker (830) to allow the user to hear voice communication, music, etc., and a microphone (835) to allow the user to transmit his or her voice through the communication device (800).

The processor (805) of the communication device (800) may connect to a memory (815). The memory (815) may be in the form of a computer-readable medium that stores data and, optionally, computer-executable instructions.

The communication device (800) may also include a communication element (840) for connection to communication channels (e.g., a cellular telephone network, data transmission network, Wi-Fi network, satellite-phone network, Internet network, Satellite Internet Network, etc.). The communication element (840) may include an associated wireless transfer element, such as an antenna.

The communication element (840) may include a subscriber identity module (SIM) in the form of an integrated circuit that stores an international mobile subscriber identity and the related key used to identify and authenticate a subscriber using the communication device (800). One or more subscriber identity modules may be removable from the communication device (800) or embedded in the communication device (800).

The communication device (800) may further include a contactless element (850), which is typically implemented in the form of a semiconductor chip (or other data storage element) with an associated wireless transfer element, such as an antenna. The contactless element (850) may be associated with (e.g., embedded within) the communication device (800) and data or control instructions transmitted via a cellular network may be applied to the contactless element (850) by means of a contactless element interface (not shown). The contactless element interface may function to permit the exchange of data and/or control instructions between mobile device circuitry (and hence the cellular network) and the contactless element (850).

The contactless element (850) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (800) and an interrogation device. Thus, the communication device (800) may be capable of communicating and transferring data and/or control instructions via both a cellular network and near field communications capability.

The data stored in the memory (815) may include: operation data relating to the operation of the communication device (800), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (800) to selected receivers.

The communication device (800) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising the steps of:
   receiving, via a clearing request component of a debit authorization module of a remotely accessible server through a computer network, a first request from a clearing entity to conduct a direct debit transaction against a financial account of a consumer at an issuer on behalf of a specific merchant, the clearing entity having received a direct debit file including the first request and other debit requests for other issuers from an acquirer that holds an account of the specific merchant;
   determining, via a checking component of the debit authorization module of the remotely accessible server, that the consumer has not previously approved a direct debit transaction against the financial account on behalf of the specific merchant based on information in a consumer record database, and:
      generating and providing via a communications network an electronic prompt to an electronic device associated with the consumer, the electronic prompt requesting the consumer to approve or deny the debit; and
      in response to the consumer indicating approval of the debit, generating a debit authorization message, updating the consumer record database to indicate that the consumer has approved the debit, and transmitting the debit authorization message to the clearing entity, and automatically generating, without further interaction by the consumer, a standing instruction associated with the specific merchant indicating that further transactions with the specific merchant are to be approved;

in response to the consumer indicating denial of the debit or failing to respond to the electronic prompt within a predetermined period, generating a denial message and transmitting the denial message to the clearing entity via the computer network;

receiving a second request from the clearing entity via the computer network to conduct a direct debit transaction against a financial account of a consumer on behalf of the specific merchant; and determining, via the debit authorization module of the remotely accessible server, that the consumer has previously approved a direct debit transaction against the financial account on behalf of the specific merchant based on the standing instruction associated with the specific merchant, and automatically generating a debit authorization message, and transmitting the debit authorization message to the clearing entity, wherein the first request is a first payment request and the second request is a second payment request, the first and second payment requests being periodic recurring payment requests of the specific merchant.

2. A method as claimed in claim 1, wherein the step of updating the consumer record database to indicate that the consumer has approved the debit includes: updating the consumer record database to indicate that upon subsequent requests from the clearing entity to conduct a direct debit transaction against the financial account of the consumer on behalf of the specific merchant, a debit authorization message is to be generated and transmitted to the clearing entity.

3. A method as claimed in claim 1, which further includes, in response to the consumer indicating denial of the debit or failing to respond to the electronic prompt within a predetermined period, updating the consumer record database to revoke any previous approval that may have been given in respect of the debit.

4. A method as claimed in claim 1, wherein the electronic prompt requires the consumer to perform an authentication step on the electronic device before allowing the debit to be approved or denied.

5. A method as claimed in claim 1, further including the steps of:
receiving a request from the electronic device of the consumer for details of standing direct debit instructions against the financial account of the consumer;
looking up, in the consumer record database, one or more standing direct debit instructions against the financial account of the consumer, each standing direct debit order associated with a merchant; and
transmitting details of the one or more standing direct debit instructions to the electronic device of the consumer.

6. A method as claimed in claim 5, further including the steps of:
receiving a request from the electronic device of the consumer to revoke a standing direct debit instruction associated with the specific merchant;
revoking the standing direct debit instruction and either removing the instruction from the consumer record database or updating the consumer record database to indicate that the instruction has been revoked; and
in response to subsequent requests from the clearing entity to debit the financial account of the consumer on behalf of the merchant associated with the instruction which was revoked, generating a denial message and transmitting the denial message to the clearing entity.

7. A method as claimed in claim 1, further including the steps of:
receiving from the electronic device of the consumer a request to reactivate an electronic prompt requirement in respect of a direct debit transaction against the financial account on behalf of the merchant.

8. A method as claimed in claim 1, further including the steps of:
receiving from the electronic device of the consumer a request to authorize a direct debit transaction against the financial account on behalf of the specific merchant, the consumer having previously denied the debit or previously failed to respond to an electronic prompt relating to the debit within a predetermined period; and
updating the consumer record database to indicate that the consumer has approved the debit, and that upon subsequent requests from the clearing entity to conduct a direct debit transaction against the financial account of the consumer on behalf of the specific merchant, a debit authorization message is to be generated and transmitted to the clearing entity.

9. A method as claimed in claim 1, further including the steps of:
receiving from the electronic device of the consumer a request to impose at least one restriction on authorization of a direct debit transaction against the financial account on behalf of the specific merchant, the at least one restriction including one or more of: requiring authorization from the consumer if a debit amount changes, requiring authorization from the consumer if a debit frequency changes, and requiring authorization from the consumer if a debit date changes; and
updating the consumer record database to indicate that upon subsequent requests from the clearing entity to conduct a direct debit transaction against the financial account of the consumer on behalf of the specific merchant, an electronic prompt is to be transmitted to the electronic device of the consumer requesting the consumer to approve or deny the debit if one or more of the at least one restriction is associated with the debit.

10. A method as claimed in claim 1, wherein the electronic device of the consumer is a mobile phone.

11. A system for authorizing a direct debit transaction, including a remotely accessible server in communication with an electronic device of a consumer, the remotely accessible server comprising:
a clearing request component for receiving a first request from a clearing entity via a computer network to conduct a direct debit transaction against a financial account of a consumer at an issuer on behalf of a merchant, the clearing entity having received a direct debit file including the first request and other debit requests for other issuers from an acquirer that holds an account of the merchant;
a prior authorization component for, if the consumer has previously approved a direct debit transaction against the financial account on behalf of the merchant, generating a debit authorization message and transmitting the debit authorization message to the clearing entity;
a prompting component for, if the consumer has not previously approved a direct debit transaction against the financial account on behalf of the merchant, generating and providing an electronic prompt to the electronic device of the consumer requesting the consumer to approve or deny the debit via a communications network;

a checking component for checking whether the consumer has previously approved a direct debit transaction against the financial account on behalf of the merchant, the checking component being configured to initiate the prior authorization component upon determining the consumer has previously approved a direct debit transaction against the financial account on behalf of the merchant and being configured to initiate the prompting component upon determining the consumer has not previously approved a direct debit transaction against the financial account on behalf of the merchant;

a consumer approval component for, in response to the consumer indicating approval of the debit, generating a debit authorization message, updating a database to indicate that the consumer has approved the debit, a standing instruction module for automatically generating, without further interaction by the consumer, a standing instruction associated with the merchant indicating that further transactions by the consumer with the merchant are to be approved, and transmitting the debit authorization message to the clearing entity via the computer network; and a consumer denial component for, in response to the consumer indicating denial of the debit or failing to respond to the electronic prompt within a predetermined period, generating a denial message and transmitting the denial message to the clearing entity, the system being further configured to receive a second request from the clearing entity via the computer network to conduct a direct debit transaction against a financial account of a consumer on behalf of the merchant, wherein the first request is a first payment request and the second request is a second payment request, the first and second payment requests being periodic recurring payment requests of the merchant.

12. A system as claimed in claim 11, clearing entity being one of a clearing house, a banking switch and a payment processing network.

13. A system as claimed in claim 11, wherein the remotely accessible server is one or more servers of an issuer.

14. A system as claimed in claim 13, wherein the issuer is an issuing bank of the consumer.

15. A system as claimed in claim 13, wherein the issuer forms part of a mobile banking system.

16. A system as claimed in claim 15, wherein the financial account of the consumer is a mobile money account held at the issuer.

17. A system as claimed in claim 11, further including the electronic device of the consumer, the electronic device being in communication with the remotely accessible server and comprising:

a receiving component for receiving the electronic prompt requesting the consumer to approve or deny the debit from the remotely accessible server;

a debit authorization interface for displaying the electronic prompt;

an authorization component for receiving a response from the consumer indicating approval or denial of the debit; and a response transmitting component for transmitting the response to the remotely accessible server.

18. A system as claimed in claim 11, wherein the remotely accessible server further comprises:

an instruction query component for receiving a request from the electronic device of the consumer for details of standing direct debit instructions against the financial account of the consumer;

an instruction look-up component for looking up, in a database, one or more standing direct debit instructions against the financial account of the consumer, each standing direct debit order associated with a merchant; and an instruction transmitting component for transmitting details of the one or more standing direct debit instructions to the electronic device of the consumer.

19. A system as claimed in claim 18, wherein the remotely accessible server further comprises:

a revocation request component for receiving a request from the electronic device of the consumer to revoke a standing direct debit instruction;

a revoking component for revoking the standing direct debit instruction and either removing the instruction from the database or updating the database to indicate that the instruction has been revoked; and a debit blocking component for, in response to subsequent requests from the clearing entity to conduct a direct debit transaction against the financial account of the consumer on behalf of the merchant associated with the instruction which was revoked, generating a denial message and transmitting the denial message to the clearing entity.

20. A system as claimed in claim 11, wherein the electronic device of the consumer is a mobile phone.

21. A computer program product for authorizing a direct debit transaction, the computer program product comprising a non-transitory computer-readable medium having stored computer-readable program code for performing the steps of:

receiving via a computer network a first request from a clearing entity to conduct a direct debit transaction against a financial account of a consumer at an issuer on behalf of a merchant, the clearing entity having received a direct debit file including the first request and other debit requests for other issuers from an acquirer that holds an account of the merchant;

checking whether the consumer has previously approved a direct debit transaction against the financial account on behalf of the merchant;

determining that the consumer has not previously approved a direct debit transaction against the financial account on behalf of the merchant, generating and providing via a communications network an electronic prompt to an electronic device of the consumer requesting the consumer to approve or deny the debit; and in response to the consumer indicating approval of the debit, generating a debit authorization message, updating a database to indicate that the consumer has approved the debit, and automatically generating, without further interaction by the consumer, a standing instruction associated with the merchant indicating that further transactions by the consumer with the merchant are to be approved, and transmitting the debit authorization message to the clearing entity; or in response to the consumer indicating denial of the debit or failing to respond to the electronic prompt within a predetermined period, generating a denial message and transmitting the denial message to the clearing entity via the computer network;

receiving a second request from the clearing entity to conduct a second direct debit transaction against the financial account of the consumer on behalf of the merchant; and determining that the consumer has previously approved the direct debit transaction against the financial account on behalf of the merchant, and generating a second debit authorization message and transmitting the debit authorization message to the clearing entity via the computer network, wherein the first request is a first payment request and the second request is a second payment request, the first and second payment requests being periodic recurring payment requests of the merchant.

\* \* \* \* \*